No. 836,873. PATENTED NOV. 27, 1906.
C. ELOFSON.
MILK PASTEURIZER.
APPLICATION FILED JULY 26, 1905.

3 SHEETS—SHEET 1.

Witnesses:

Inventor:
Charles Elofson,
By Law Bagger & Co
Attorneys

No. 836,873. PATENTED NOV. 27, 1906.
C. ELOFSON.
MILK PASTEURIZER.
APPLICATION FILED JULY 26, 1905.

3 SHEETS—SHEET 2.

Witnesses:
W. H. Ourand
J. T. Mister

Inventor:
Charles Elofson,
By Louis Bagger & Co.,
Attorneys.

No. 836,873. PATENTED NOV. 27, 1906.
C. ELOFSON.
MILK PASTEURIZER.
APPLICATION FILED JULY 26, 1905.
3 SHEETS—SHEET 3.
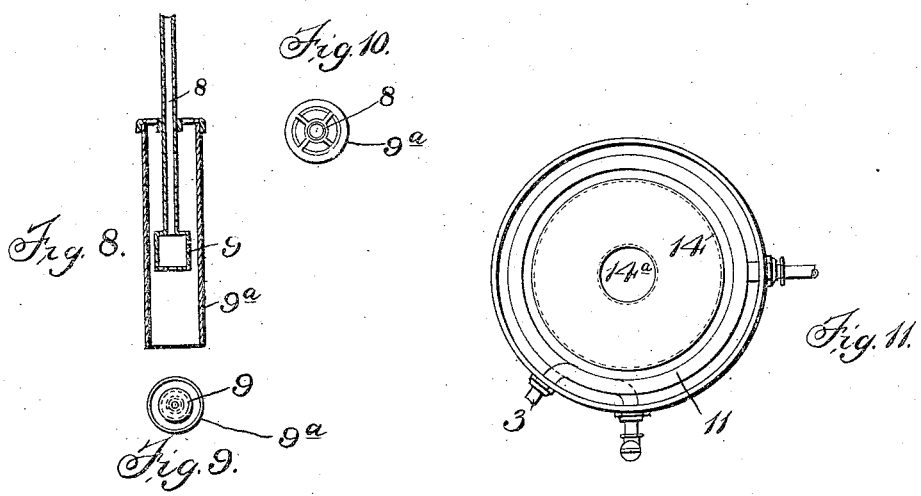
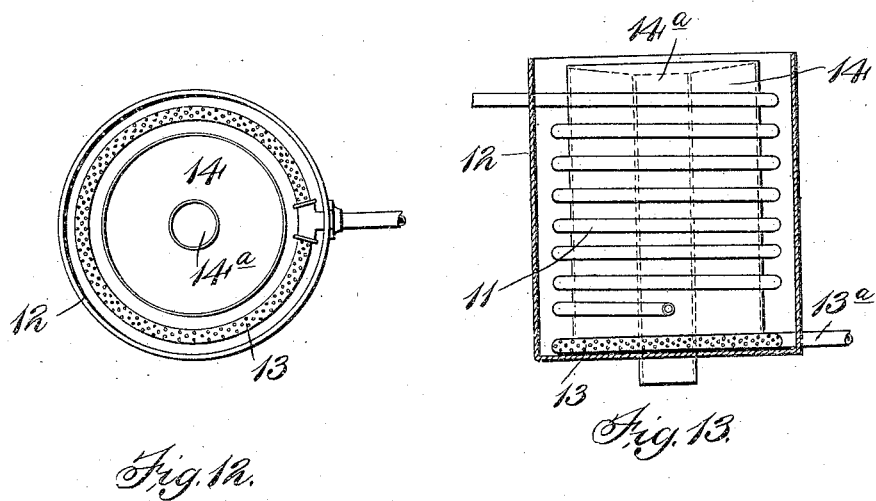
Witnesses:
Inventor:
Charles Elofson,

UNITED STATES PATENT OFFICE.

CHARLES ELOFSON, OF MINNEAPOLIS, MINNESOTA.

MILK-PASTEURIZER.

No. 836,873.

Specification of Letters Patent.

Patented Nov. 27, 1906.

Application filed July 26, 1905. Serial No. 271,334.

*To all whom it may concern:*

Be it known that I, CHARLES ELOFSON, a citizen of the United States, residing at Minneapolis, in the county of Hennepin and State of Minnesota, have invented new and useful Improvements in Milk-Pasteurizers, of which the following is a specification.

My invention pertains to improvements in what may be termed "pasteurizing" apparatus, especially for sterilizing or pasteurizing milk.

It has for its object principally to effect the aforesaid treatment of the liquid or milk in an effective, expeditious, and simple manner; and to these ends said invention consists of certain structural features, substantially as hereinafter fully disclosed, and particularly pointed out by the claims.

Figure 1:
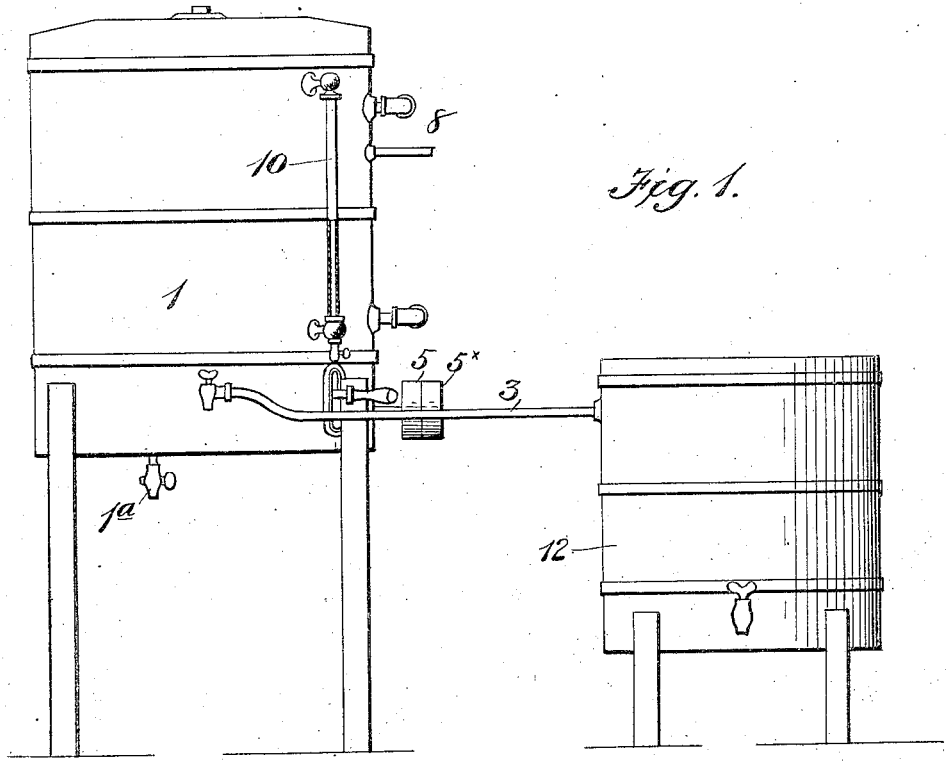
Figure 2:
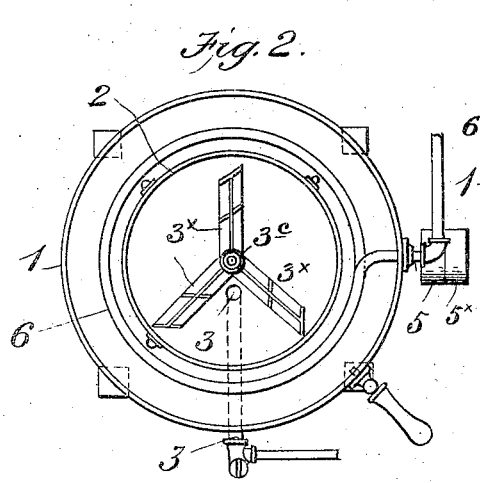
Figure 3:
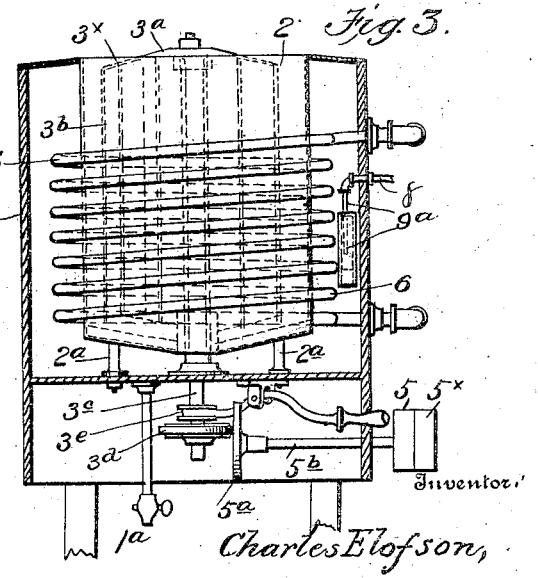
Figure 4:
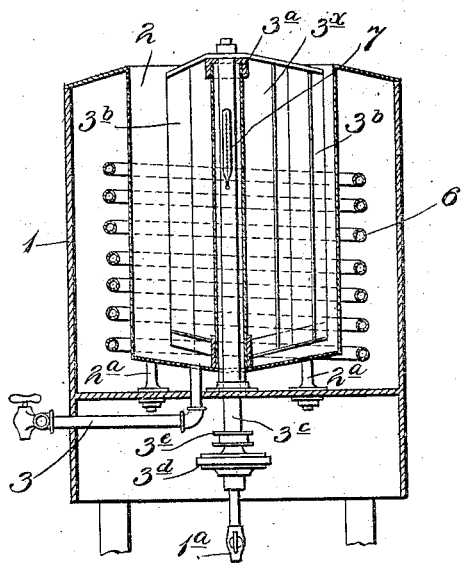
Figure 6:
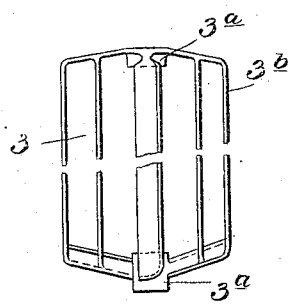
Figure 5:
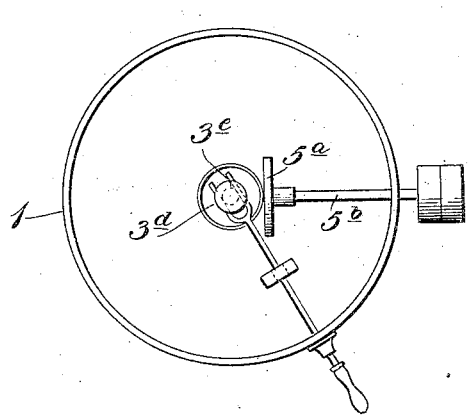
Figure 7:
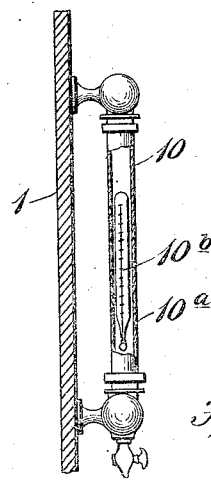

In the accompanying drawings, illustrating the preferred embodiment of my invention, Figure 1 is a side elevation thereof, connected up with a cooler. Fig. 2 is a plan view of the same. Fig. 3 is a vertical section thereof. Fig. 4 is a similar section produced about at right angles to the plane of the section of Fig. 2. Fig. 5 is a horizontal section, taken just below the water-tank bottom, showing more particularly the pulley-shipping mechanism for the agitator-shaft of the tank. Fig. 6 is a detached view of the liquid or milk agitator. Fig. 7 is a fractional and a partly-sectional and partly side view, showing more particularly the combined water and heat gage for the water-tank. Fig. 8 is a nozzle and muffler attachment for the steam-inlet pipe for the water-tank. Figs. 9 and 10 are inverted and plan views of the contrivance shown by Fig. 8. Fig. 11 is a plan view of the cooler. Fig. 12 is a horizontal section produced through Fig. 13 directly above the water-spraying pipe or coil, and Fig. 13 is a vertical section taken through Fig. 11.

In carrying out my invention, I employ a tank 1 for receiving or containing water for heating suitably introduced thereinto and which has a faucet-equipped water-drawing-off pipe $1^a$, said tank being again referred to later.

Within the tank 1 and centrally thereof is fixed a second or additional tank 2, of even height therewith and suitably secured or supported, as at $2^a$, upon an upraised or elevated bottom of the tank 1, and is to receive or contain the milk to be treated or sterilized.

Extending from the bottom of the tank 2 is a faucet-equipped pipe 3 for suitably conducting away the pasteurized or sterilized milk for cooling, as presently explained. Said tank 2 has arranged therein an upright agitator $3^\times$ for suitably acting upon the milk or contents thereof, comprising central tubular or hub end members $3^a$, having radiating therefrom frame-like blades $3^b$, slipped upon a central upright shaft $3^c$, passing through the tank-bottoms and suitably positioned in the lower one of the latter. These blades are effective by reason of the angularity of their arrangement to throw the milk toward the center and upward for its more thorough agitation and to effectively expose its globules to the desired heating or sterilizing action, as will be readily apparent. Said shaft is driven and has applied thereto below the outer tank-bottom a suitable frictional pulley or disk $3^d$, having a sliding connection therewith and equipped with a collar $3^e$, with which is adapted to engage a shipping-lever. Said lever is hung from the lower side of the outer tank-bottom for providing for shipping or moving said disk or pulley into and out of engagement with the face of the disk or wheel $5^a$, secured to a shaft $5^b$ of the fixed driving-pulley 5, said shaft also bearing a loose pulley $5^\times$, the purpose of which is apparent.

A pipe 6, formed into numerous coils encompassing the inner milk tank or receptacle 2 and arranged within the outer tank 1, has its ends suitably connected to the steam and water spaces of a boiler, (not shown,) respectively, to provide for the passing of live steam through said pipe-coils for suitably heating the water contained within the tank 1 for accordingly heating or raising the temperature of the milk in the tank 2 therein for the purpose aforesaid. To provide for observing the temperature of the milk, a thermometer 7 is suitably secured centrally within the milk receptacle or tank.

In order to set the water in the tank 1 in circulation or motion for equalizing the temperature of the water throughout the milk-tank 2 for uniformly affecting or raising the temperature of the milk, a pipe connection 8 is effected therebetween and the boiler for introducing steam into said water, and in order to deaden or muffle the sound arising therefrom a nipple 9, with a jet-opening through its discharge end, is screwed or connected to the submerged end of the pipe connection 8. Also to aid in this result a piece of pipe or tubing 9ª, open at both its upper and lower ends, is adapted to be suitably suspended or hung from the pipe connection 8 and surround or inclose the nipple-equipped end of the latter, as shown.

A combined water and heat gage 10 is suitably applied to the outside of the water-tank and communicates with the interior or contained water of said tank. It consists, preferably, of a glass or transparent tube member 10ª, effective to receive the water of the tank and having arranged therein a thermometer 10ᵇ, the action of which is apparent and which may be readily read.

When the required treatment of the milk in the tank 2 has been reached, the treated or sterilized milk is run through the pipe 3 to a coiled pipe 11, arranged within a tank 12, suitably supported in position and for providing, as presently seen, for cooling the milk or reducing it to normal temperature. Within this tank is also arranged an annular foraminous pipe or nozzle 13, resting upon the bottom thereof and having suitable pipe connection 13ª with a supply or head of water (not shown) to render said foraminous nozzle effective for delivering water into the tank 12, the water rising upward within said tank into contact with the pipe-coils 11 and producing a cooling effect thereon for the purpose aforesaid. Also arranged within the tank 12 and centrally of the nozzle 13 and the pipe-coil 11 is a drum 14 cylindric in its general outline, with its upper end or head dished or concaved toward the center and having a central outlet-tube 14ª joining said head in alinement with a central opening in said head and depending centrally through the bottom of the tank 12. Thus by means of the aforesaid structure it will be noted that the water rising around the tank 14 into the extreme upper end of the outer tank 12 will overflow said drum and flow down along the dished or concaved head thereof and enter the outlet-tube 14ª, and the overflow-water thereby be continually discharged therefrom.

I claim—

1. Apparatus of the character described, comprising an inner tank for containing milk, an outer tank for containing water and encompassing the aforesaid tank, means for continuously passing steam through said outer tank, close to said inner tank with the effect of delivering the heat thereof both to the water in said outer tank and to the milk in said inner tank, and having connection with a steam-supply at one end and adapted to drain off the water of condensation at the other end, and means for delivering steam into the water in said outer tank, controlled so as to induce a circulation of the water therein.

2. Apparatus of the character described, comprising an inner tank for containing milk, an outer tank for containing water, a pipe for continuously passing steam through said outer tank and encompassing said inner tank for delivering heat to both the water in said outer tank and the milk in said inner tank, said pipe having connection with a steam-supply at one end and adapted to drain off the water of condensation at its other end, and a steam-delivery pipe having its discharge end submerged within said outer water-tank for inducing a water circulation therein.

3. Apparatus of the character described, comprising an inner milk-tank, an outer water-tank, means for continuously passing steam through said water-tank and around said milk-tank, with the effect of delivering the heat thereof to both the water in said outer tank and to the milk in said inner tank, means for delivering steam directly into said water-tank, said milk-tank being equipped with a central tube, a suitably-driven shaft arranged in said tube, and an agitator arranged in said inner tank and having its arms radiating from hubs or sleeves, one sleeve or hub fitting upon said tube and the other sleeve or hub fitted tightly upon said shaft at its upper end.

In testimony whereof I affix my signature in presence of two subscribing witnesses.

CHARLES ELOFSON.

Witnesses:
JOHN N. BERG,
TOYGUE WEGGE.